United States Patent

Moriya

[11] Patent Number: 5,984,183
[45] Date of Patent: Nov. 16, 1999

[54] CARD READER FOR TWO KINDS OF DATA CARDS

[75] Inventor: Paulo Takashi Moriya, Campinas, Brazil

[73] Assignee: Telecomunicacoes Brasileiras S/A-Telebras, Campinas SP, Brazil

[21] Appl. No.: 08/981,841
[22] PCT Filed: Jul. 11, 1996
[86] PCT No.: PCT/BR96/00036
  § 371 Date: Oct. 9, 1998
  § 102(e) Date: Oct. 9, 1998
[87] PCT Pub. No.: WO97/03413
  PCT Pub. Date: Jan. 30, 1997

[30] Foreign Application Priority Data

Jul. 12, 1995 [BR] Brazil ................................ PI9502336

[51] Int. Cl.⁶ ........................................................ G06K 7/00
[52] U.S. Cl. ........................ 235/440; 235/441; 235/449; 235/492; 235/493; 360/2; 360/97.01
[58] Field of Search .................................. 235/440, 441, 235/449, 439, 446, 450, 451, 492, 485, 483, 493; 360/2, 88, 97.01

[56] References Cited

U.S. PATENT DOCUMENTS 4,931,622 6/1990 Ohtsuki et al. ........................... 235/487
5,091,618 2/1992 Takahashi ................................ 235/441
5,198,645 3/1993 Martin et al. ........................... 235/441
5,225,653 7/1993 Martin et al. ........................... 235/441
5,332,890 7/1994 Kitahara ................................... 235/440

FOREIGN PATENT DOCUMENTS 0198739 3/1985 European Pat. Off. .
0357827 3/1990 European Pat. Off. .
 429976 6/1991 European Pat. Off. .

Primary Examiner—Donald Hajec
Assistant Examiner—Diane I. Lee
Attorney, Agent, or Firm—Finnegan, Henderson, Farabow, Garrett & Dunner, L.L.P.

[57] ABSTRACT

The reading head having the capability of processing two different data cards of the inductive type and chip-cards provided with contact pads on their surface. The raising and lowering of connection pins which contacting the pads is achieved by linking the pin supporting plate to rocking C-shaped driving arms having bifurcated free upper ends slidingly coupled to pivots which are attached to the plate. The lower limbs of the arms extend parallel to the lower face of the upper part of the reading head, the limbs having bosses facing the lower face, the gap between the bosses and the face being roughly equal to the thickness of an inductive card. The greater thickness of a chip-card presses down the bosses bringing about a clockwise rotation of the C-shaped arms around a fixed shaft resulting in a lowering of the connection pins which touch the contact pads on the card surface.

5 Claims, 4 Drawing Sheets

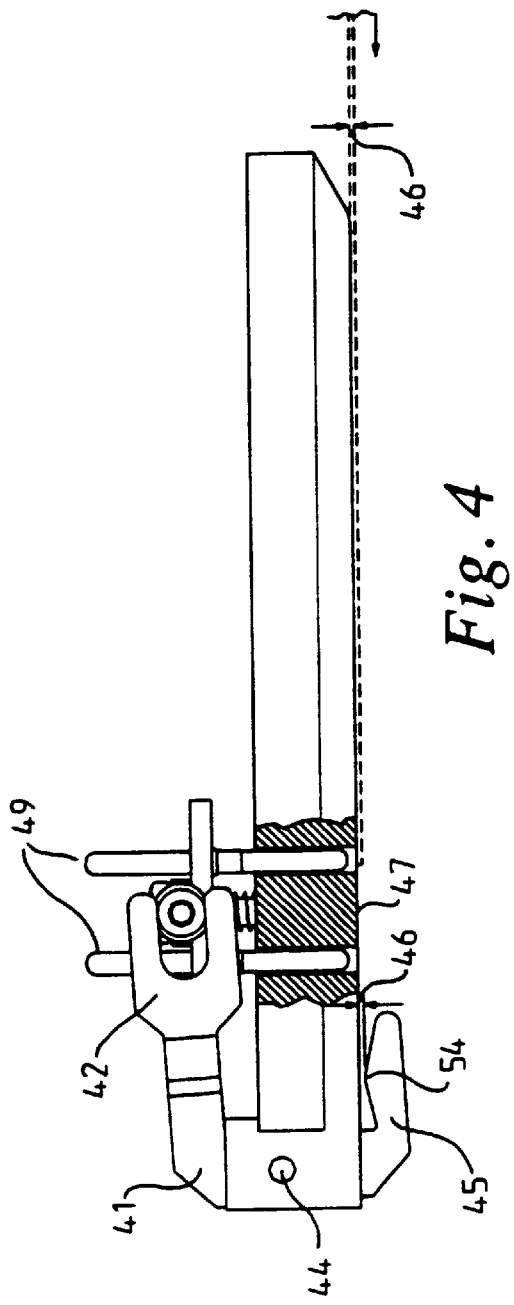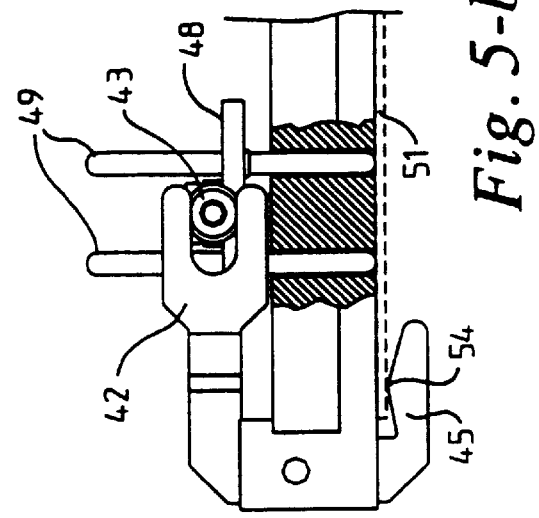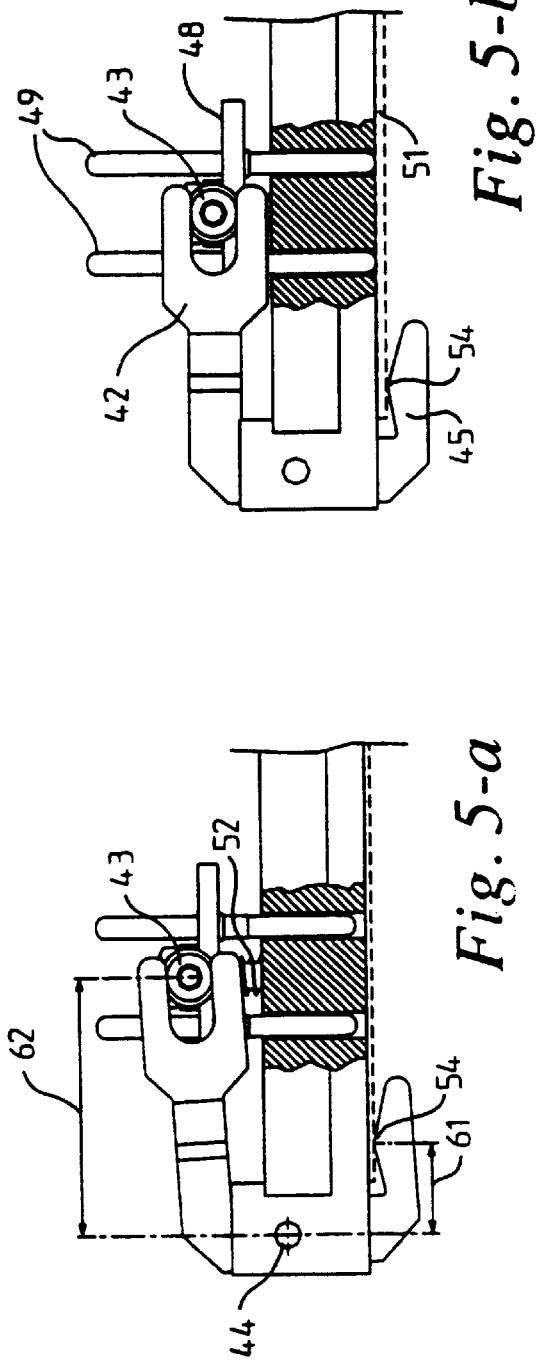

CARD READER FOR TWO KINDS OF DATA CARDS

BACKGROUND OF THE INVENTION

The present invention refers to devices capable of statically processing, indifferently, elements bearing data by means of inductive cells of the type described in patent document PI (BR) 7804885 and PI (BR) 9201380, as well as chip-cards using contacts. More specifically, the present invention concerns the modifications introduced into the lifting and lowering mechanism of the eletric contact pins of the static reading head which engage the contact pads provided on the surface of the chip-cards, simplifying said mechanism and making it easier to withdraw the card after its use.

A reading head capable of carrying out the processing of two types of cards is shown in FIG. 1 of the present application having been already described in patent document PI (BR) 9404627-1. In this known reading head, the fitting-in of cards having different thicknesses is achieved by means of a lifting and lowering mechanism of the magnetic plate 142. Said mechanism comprises frames 84, 85, tabs 93, 94, directional retainer 86 and stop rod 88. The vertical movement of block 161 to which contact pins 162 are attached is provided by the above mentioned elements associated with brackets 150 and 152 which move simultaneously with frames 84 and 85. Said pins provide the electrical connection with contact pads on the chip-card surface (not shown).

The reading head shown in FIG. 1 exhibits, however, some disadvantages, such as a relatively high cost resulting from the complexity of the lifting device. Moreover, the fact that said lifting and lowering motions are provided by the combined action of mutually sliding mechanical parts brings about an accelerated wear of the contacting surfaces, thus impairing the operation of the device in the long run. Furthermore, the lifting of the magnetic plate and contact pin supporting block 161 occur simultaneously by employing the user's card pulling effort, so as to overcome the combined resistance of the springs which provide the lowering of said elements and the friction of the sliding surfaces. This demands a substantial effort from the user; pulling strength values higher than 5 N have been measured in field tests.

Additionally, the known device does not discriminate between (thicker) chip-cards and (thinner) inductive cards which results in the lowering of contact pins 162 every lime any card is inserted into the reading head, hasteninig the mechanical wear of the parts associated with said movement.

Considering the foregoing, the present invention aims to reduce the complexity of the reading device, without sacrificing its performance.

A further aim is to decrease the mechanical wear by means which discriminate between the thinner inductive cards and the thicker chip-cards so as to have the contact pins moving only when chip-cards are inserted into the reading head.

SUMMARY OF THE INVENTION

The above mentioned aims are achieved by the present invention by means of lifting and lowering the contact pin supporting block using rocking brackets turning around a shaft fixed at the upper part of the reading head, the amount of rotation being a function of the thickness of the card inserted into the reading head. Thus, the main feature of the present invention is the fact that the contact pins will only move if a chip-card is inserted in the reading head, because such card is substantially thicker than an inductive card.

The advantages and the features of the present invention will become more evident from the description of a preferred embodiment and the accompanying drawings thereof.

DESCRIPTION OF THE DRAWINGS

FIG. 4 shows, by means of an elevation view partially cross sectioned, the reading head according to the present invention.

FIGS. 5-*a* and 5-*b* show the vertical movement of the electrical contact pins when two cards of different thicknesses are inserted in the reading head.

DETAILED DESCRIPTION OF A PREFERRED EMBODIMENT

Figure 1:
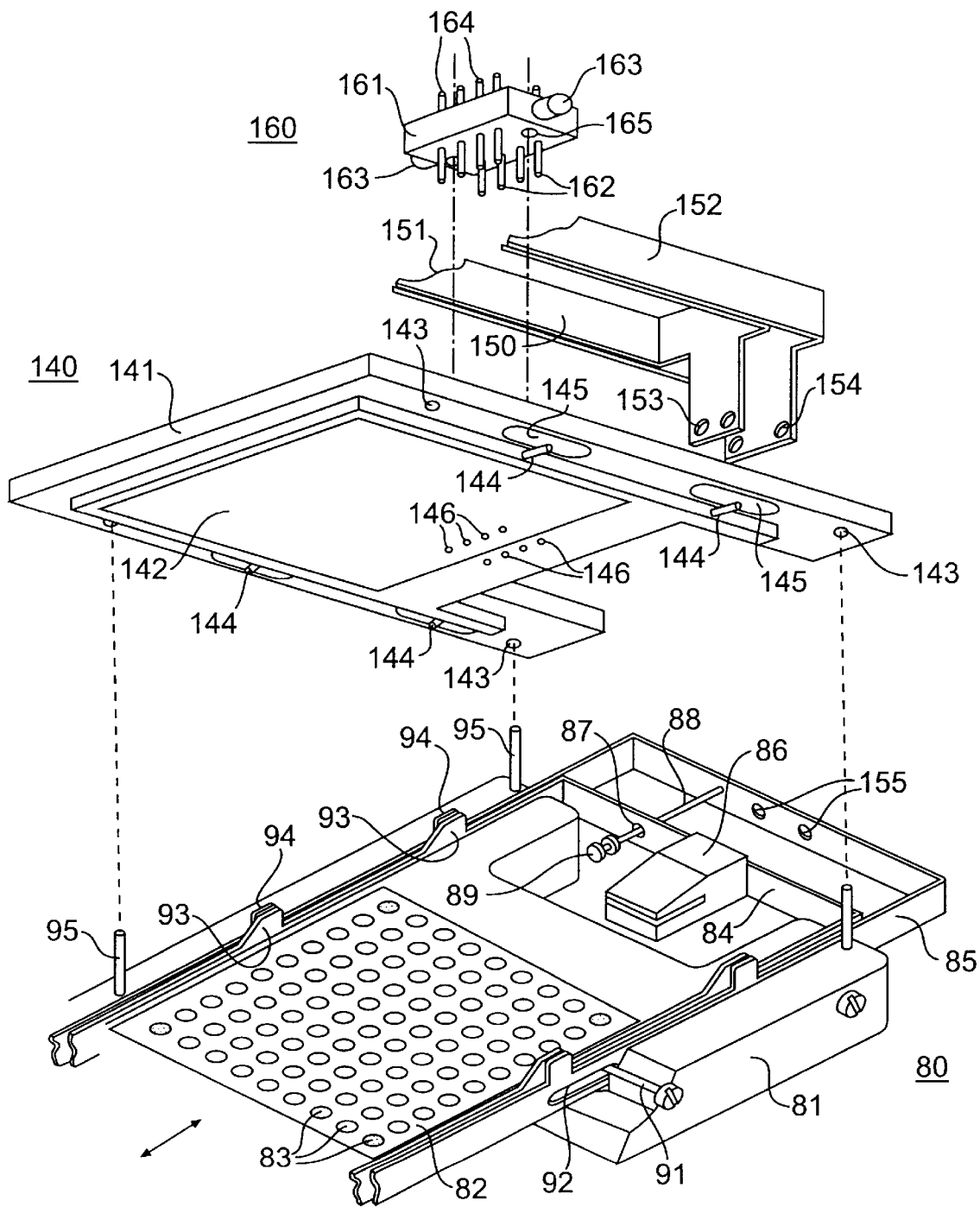
FIG. 1 shows, in a partially exploded perspective view, a prior art reading head as described in patent document PI 9404627-1.
Figure 2:
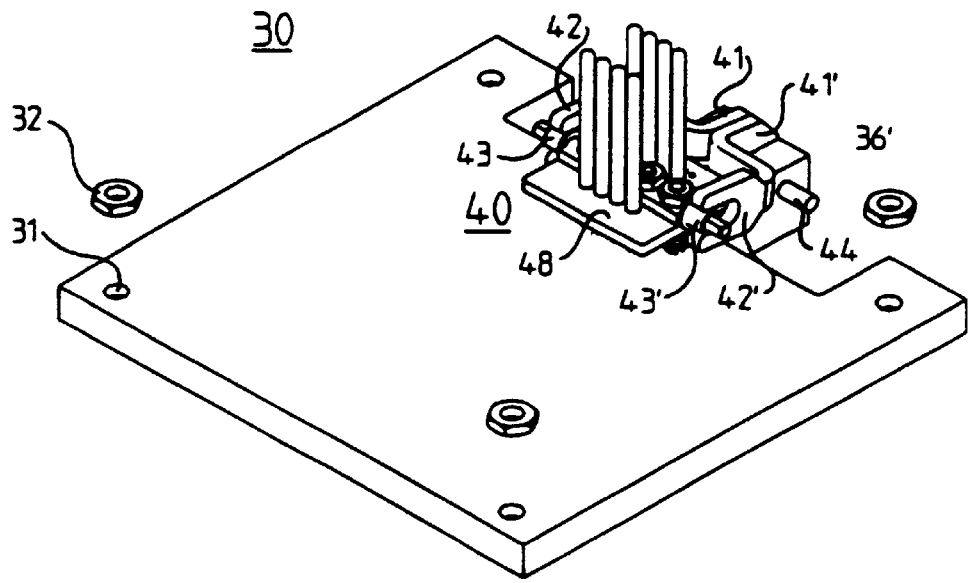
FIG. 2 shows, in a partially exploded perspective view, the reading head constructed according to the present invention.
Figure 2:
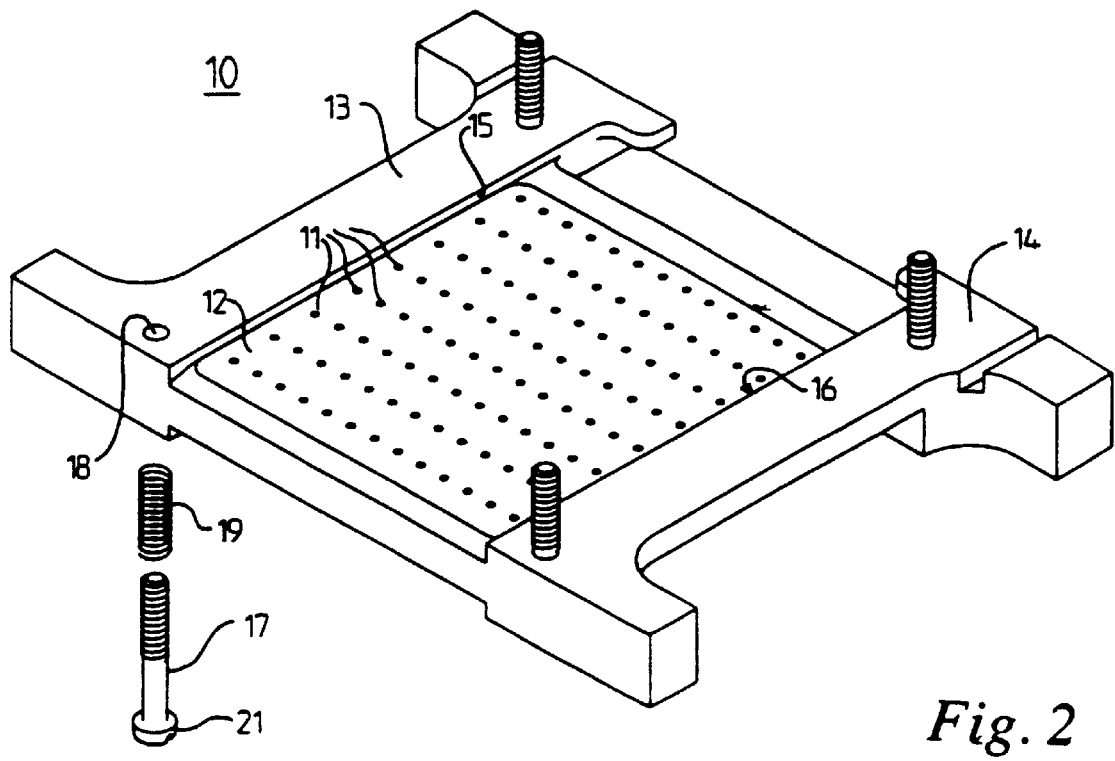
Figure 3:
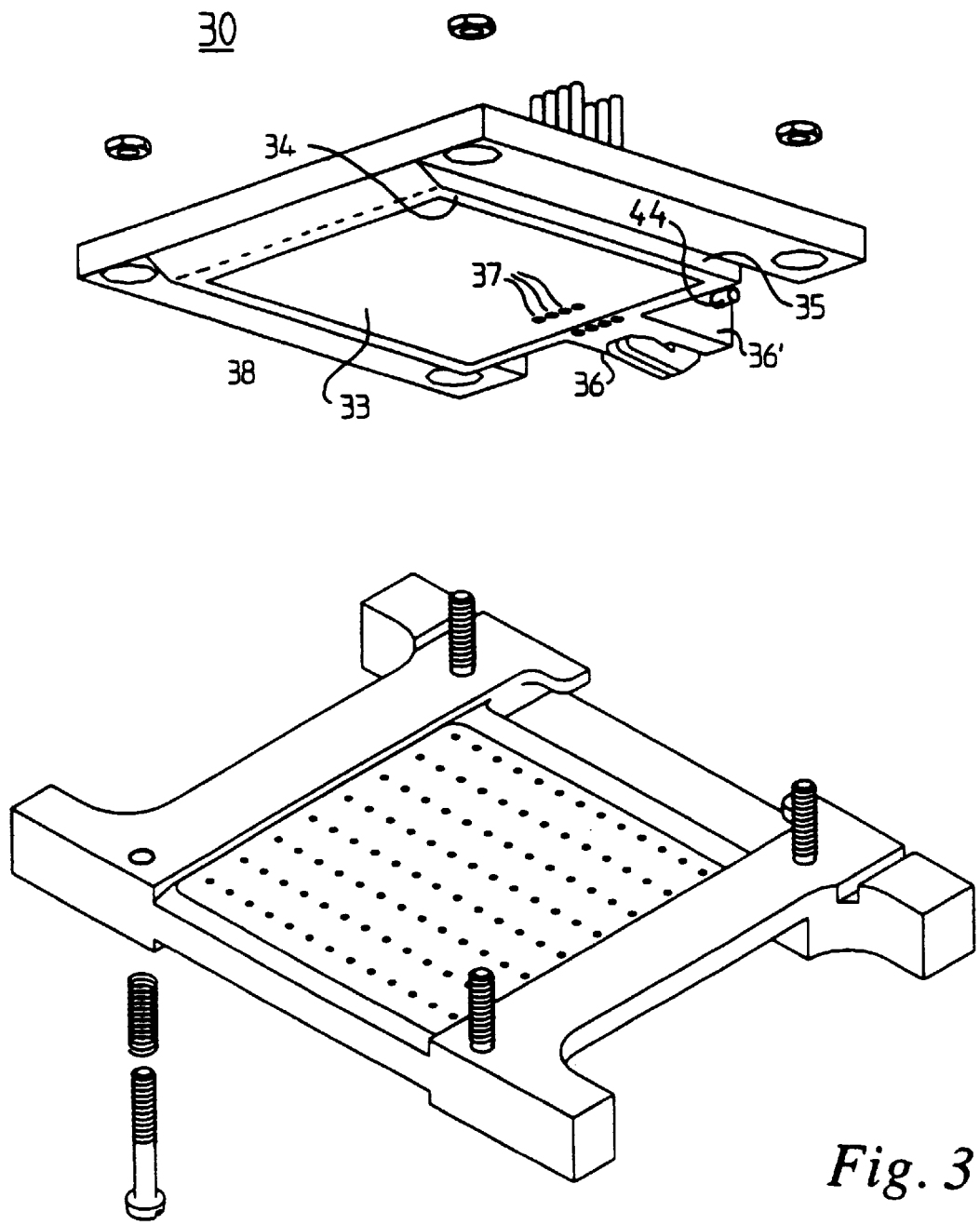
FIG. 3 shows the same reading head, in a partially exploded perspective view, depicting its upper part as seen from below.

As shown in FIGS. 2 and 3, the reading head comprises two dissimilar and complementary parts, 10 and 30, the lower part or base 10 incorporating the inductive sensors for reading and burning out credits contained in the inductive cards, said figures showing only the upper ends 11 of the rod-shaped sensors' nuclei arranged in a retangular matrix according to known techniques. Said ends 11 are aligned with the insulating plane 12 forming a continuous surface without bumps or hollows over which the card is slidingly inserted or withdrawn. The lateral portions 13, 14 of said base are slightly raised in relation to the main plane 12, their ridges 15, 16 forming lateral runners for guiding the cards. Said base further comprises guiding means for the upper part of the reading head, such as the bolts 17 depicted in FIGS. 2 and 3, which fit into holes 18. The upper part of said bolts fit loosely into the corresponding holes 31 of upper reading head part 30. Nuts 32 are attached to the upper ends of said bolts above said part 30. The mutual compression between portions 10 and 30 is achieved by the action of springs 19 fitted between recesses provided in the lower surface of base 10 (not shown) and screw heads 21, as shown on FIG. 2.

Still according to FIGS. 2 and 3, the upper part 30 of the reading head is shaped roughly like a slab with the main central portion 34 forming a platform raised in relation to the lateral portions 38. The greater part of said platform is occupied by the magnetic plate 33, its lower surface being aligned with the plane of 34 whose sides 35 fit loosely into the gap between ridges 15 and 16 in said base 10. To said upper part 30 is attached sub-assembly 40, which lowers and lifts contact pins 49 which electrically connect the reading head circuits with the chip(s) of the smart cards, through contact pads on the latter's surface, allowing for the interchange and processing of information.

According to what is shown in FIGS. 2, 4 and 5, device 40 comprises simetrically joined C-shaped rocking driving arms 41, 41' whose upper limbs have bifurcated ends 42, 42', a pivot provided with an external roller 43 fitting slidingly in the gap between the prongs of each one of said ends, said pivots being attached to insulating plate 48 which supports contact pins 49. The central vertical portion of said driving arms is provided with a through hole (not shown in the figures) aligned with similar through holes in the rear projections 36, 36' which extend from the rear portion of part 30 of the reading head. The coupling between said C-shaped rocking arms and said part 30 is provided by shaft 44, which passes through all of the above mentioned holes, allowing the rotation of said arms.

FIGS. 4, 5-a and 5-b show the conditions at which said movement occurs. At the rest position of the device, shown in FIG. 4, there is a gap 46 between the lower surface 47 of said part 30 and bosses 54, which face said surface, provided in the lower limbs 45, 45' of said C-shaped arms. Said gap is substantially equal to the thickness of the inductive card. Thus, the insertion of this kind of card will not press said bosses, and the driving arms will remain at their rest position, as shown in FIG. 5-a.

When a chip-card is inserted, the greater thickness of it will press down the bosses 54 on said branches 45, 45', bringing about the clockwise rotation of the driving arms as shown in FIG. 5-b. This rotation lowers the upper ends 42, 42' of the C-shaped arms, drawing plate 48 closer to the upper surface of part 30 by means of the attached pivots/rollers 43. As a consequence, the contact pins 49 which are attached to said plate 48 will be lowered, touching the contact pads (not shown) on the surface of the chip-card 51, thus providing the electric connection between the card circuits and the reading head.

When the card is pulled out by the user, spring 52 presses upwardly plate 48, drawing the lower ends of pins 49 inside through holes 37, as shown in FIGS. 4 and 5-a, allowing the free withdrawal of the inductive card.

As can be inferred by examining FIGS. 4 and 5, the vertical displacement of plate 48 and upper part of contact pins 49 is slightly larger than the difference between the thicknesses of the inductive and chip-cards. This displacement increase is proportional to the relation between distance 62 (between centers of pivots 43, 43' and shaft 44) and the smaller distance 61 (between shaft 44 and boss 54). The larger this relation, the greater will be said vertical displacement relative to the thickness difference. Given the fact that, according to known techniques, the lower ends of said contact pins are connected to their upper ends by elastic means, the pressure exerted by the lower ends of contact pins 49 against the contact pads on the card will be also larger.

What is claimed is:

1. MODIFIED READING HEAD FOR TWO KINDS OF DATA CARDS, a first data card being thinner and comprising fusible inductive credit cells and a second data card being thicker and comprising semiconductor chips connected with contact pads on the card's surface, said reading head comprising a lower part (10) incorporationg a matrix of inductive sensors for an interchange of information with cards of the inductive type, and an upper part (30) comprising a magnetic plate (33) and a sub-assembly (40) incorporating means for connecting circuits on said reading head with contact pads on the second data card (51), said connecting means comprising electric contact pins (49) attached to a supporting plate (48) which, at an end of the card travel during insertion in said reading head undergo a displacement parallel to longitudinal axis of said pins, wherein said supporting plate is coupled to rocking means (41, 41') which rotate around a shaft (44) fixed to said upper part (30) of said reading head.

2. MODIFIED READING HEAD FOR TWO KINDS OF DATA CARDS, according to claim 1, wherein said rocking means comprise two symmetrically joined driving arms (41,41'), substantially shaped like a "C" when viewed on lateral elevation, each comprising an upper limb (42) extending above the upper part (30) of the reading head and substantially parallel to a main plane of said upper part, a lower limb (45) substantially parallel to said upper part and extending below said upper part and a third intermediary portion between ends of said first and second limbs and substantially perpendicular to both, said third intermediary portion being provided, in a roughly central position, with a through hole into which fits a shaft (44) which also traverses projections (36, 36') of said upper part.

3. MODIFIED READING HEAD FOR TWO KINDS OF DATA CARDS, according to claim 2, wherein a conversion of a rocking motion of said driving arms (41, 41') into a linear displacement of said supporting plate (48) is provided by a sliding coupling between rollers and pivots (43) attached to said supporting plate and a gap between prongs of bifurcated ends of the upper limbs (42, 42') of said driving arms.

4. MODIFIED READING HEAD FOR TWO KINDS OF DATA CARDS, according to claim 2, wherein each one of said lower limbs (45, 45') of the driving arms (41, 41') is provided with a boss (54) facing the lower surface (47) of said upper part (30) of the reading head, a gap (46) between said boss and said lower surface being roughly equal to the thickness of first data card.

5. MODIFIED READING HEAD FOR TWO KINDS OF DATA CARDS, according to claim 4, wherein a distance (62) between centers of pivot (43) and of the shaft (44) is greater than the distance (61) between said shaft and the boss (54) facing the lower surface (47) of the reading head's upper part(30), provided on the lower limbs (45, 45') of the driving arms (41,41').

* * * * *

UNITED STATES PATENT AND TRADEMARK OFFICE
CERTIFICATE OF CORRECTION

PATENT NO. : 5,984,183  
DATED : November 16, 1999  
INVENTOR(S) : Paulo Takashi Moriya Page 1 of 1

It is certified that error appears in the above-identified patent and that said Letters Patent is hereby corrected as shown below:

<u>Column 4, claim 5,</u>  
Lines 49-50, "the driving arms" should read -- rocking driving arms --.

Signed and Sealed this

Twelfth Day of March, 2002

Attest:

Attesting Officer

JAMES E. ROGAN  
*Director of the United States Patent and Trademark Office*